United States Patent
Park et al.

(10) Patent No.: US 9,412,049 B2
(45) Date of Patent: Aug. 9, 2016

(54) APPARATUS AND METHOD FOR RECOGNIZING OBJECT USING CORRELATION BETWEEN OBJECT AND CONTENT-RELATED INFORMATION

(71) Applicant: ELECTRONICS AND TELECOMMUNICATIONS RESEARCH INSTITUTE, Daejeon (KR)

(72) Inventors: So Yung Park, Daejeon (KR); Hwa Suk Kim, Daejeon (KR); Jae Cheol Sim, Daejeon (KR); Cho Rong Yu, Daejeon (KR); Kee Seong Cho, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 14/589,203

(22) Filed: Jan. 5, 2015

(65) Prior Publication Data
US 2015/0206034 A1    Jul. 23, 2015

(30) Foreign Application Priority Data
Jan. 21, 2014  (KR) .................. 10-2014-0007405

(51) Int. Cl.
*G06K 9/46* (2006.01)
*G06K 9/62* (2006.01)
*G06F 17/30* (2006.01)
*G06K 9/72* (2006.01)

(52) U.S. Cl.
CPC ........ *G06K 9/6278* (2013.01); *G06F 17/30259* (2013.01); *G06K 9/72* (2013.01); *G06K 2209/27* (2013.01)

(58) Field of Classification Search
CPC ..... G06K 9/6267; G06K 9/72; G06K 9/6201; G06F 17/30247
USPC ....................................................... 382/195
See application file for complete search history.

(56) References Cited

U.S. PATENT DOCUMENTS

| | | | |
|---|---|---|---|
| 8,316,302 B2 | 11/2012 | McKoen et al. | |
| 2004/0098376 A1 | 5/2004 | Li et al. | |
| 2011/0096135 A1 | 4/2011 | Hegde et al. | |
| 2013/0223749 A1 | 8/2013 | Na et al. | |
| 2014/0181668 A1* | 6/2014 | Kritt ............ | G06F 3/0484 715/719 |

FOREIGN PATENT DOCUMENTS

| | | |
|---|---|---|
| KR | 10-2009-0125292 A | 12/2009 |
| KR | 10-2012-0102043 A | 9/2012 |

\* cited by examiner

*Primary Examiner* — Ruiping Li
(74) *Attorney, Agent, or Firm* — LRK Patent Law Firm

(57) ABSTRACT

An apparatus and method for recognizing an object using correlation information about an object and content-related information which is generated based on the content-related information. The apparatus includes a data classifier, a data analyzer, a correlation manager, and an object identifier.

7 Claims, 5 Drawing Sheets

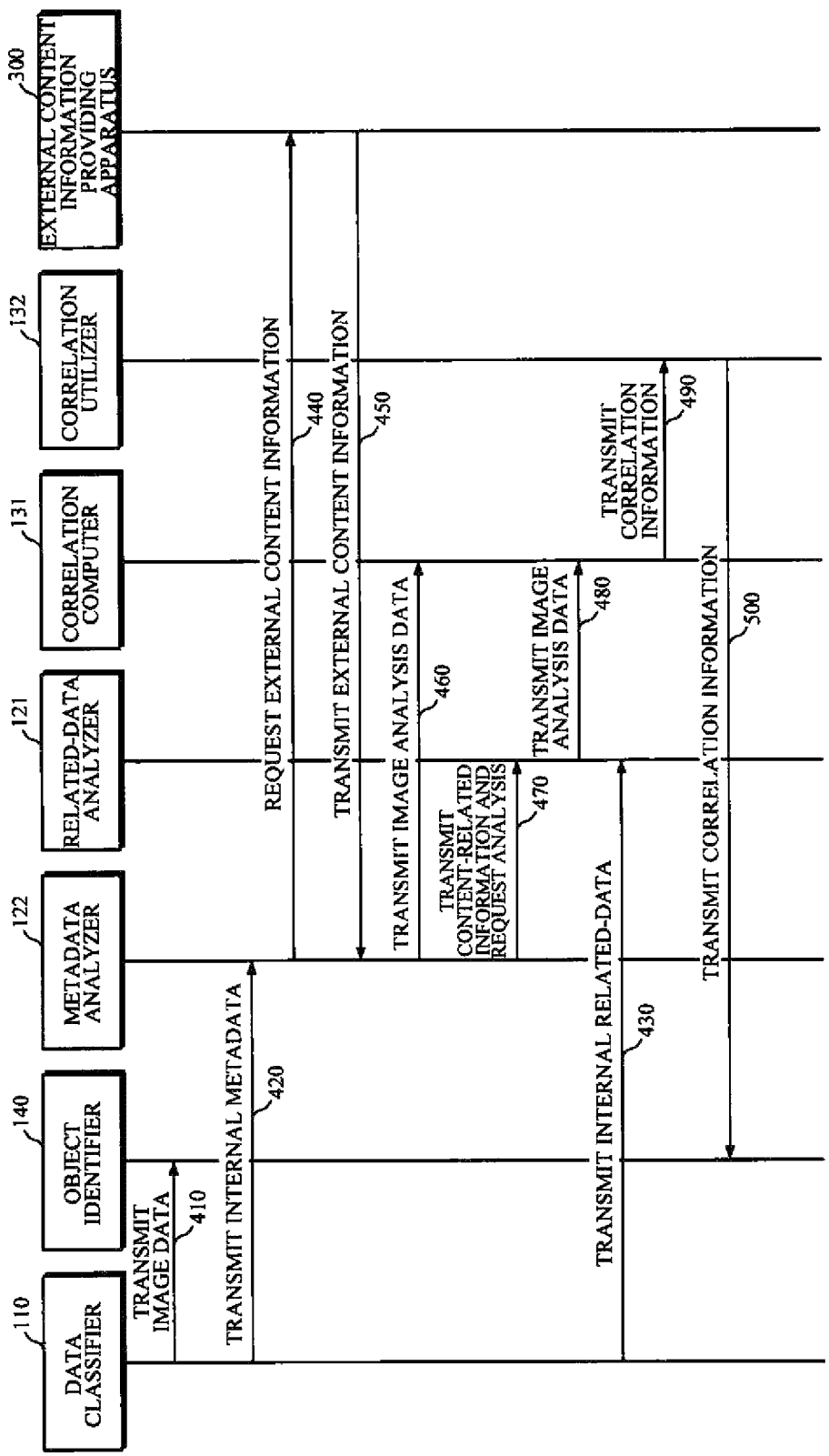

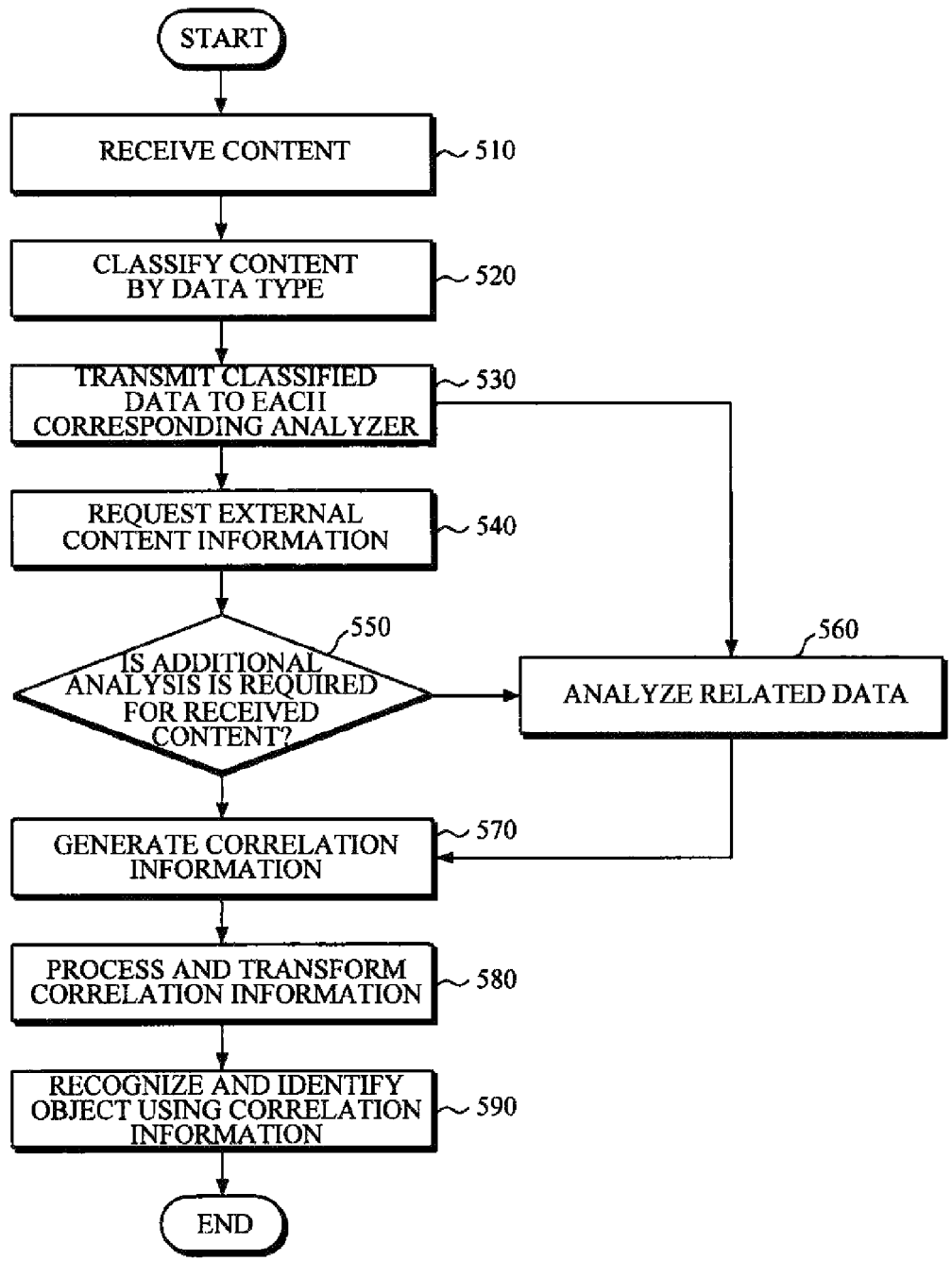

APPARATUS AND METHOD FOR RECOGNIZING OBJECT USING CORRELATION BETWEEN OBJECT AND CONTENT-RELATED INFORMATION

CROSS-REFERENCE TO RELATED APPLICATIONS)

This application claims priority from Korean Patent Application No. 10-2014-0007405, filed on Jan. 21, 2014, in the Korean Intellectual Property Office, the disclosure of which is incorporated herein by reference in its entirety.

BACKGROUND

1. Field

The following description relates to an apparatus and method for recognizing an object, and more particularly, to an apparatus and method for effectively recognizing an object using image-object-related-information correlation information generated by utilizing content-related information.

2. Description of the Related Art

Object recognition has been long developed, and partially utilized in medical and security fields. However, to expand the applications of object recognition technologies to other fields, it is considered that a technological leap for performance improvement is a prerequisite.

It is possible to improve object recognition performance through development of computer vision technologies, use of big-data-based high performance platform, and utilization of image-related information.

SUMMARY

In one general aspect, there is provided an apparatus for recognizing an object using correlation information about an object and content-related information, the apparatus including: a data classifier configured to receive content and separate the content into internal related-data, internal metadata, and image data; a data analyzer configured to request and receive external content information and analyze the separated data and the received external content information and generate image analysis data to be used to search for and extract information about a correlation between an object included in the content and content-related information; a correlation manager configured to store information about a correlation between the object and related information and generate the correlation information about the object and the related information by matching the received image analysis data with the stored information about a correlation between the object and the related information; and an object identifier configured to receive the image data and the generated correlation information and identify a particular object in the image data.

Other features and aspects will be apparent from the following detailed description, the drawings, and the claims.

BRIEF DESCRIPTION OF THE DRAWINGS

FIG. 4 is a diagram illustrating a scenario of data flow between an object recognition apparatus and a peripheral device according to an exemplary embodiment.

FIG. 5 is a flowchart illustrating an object recognition method according to an exemplary embodiment.

Figure 1:
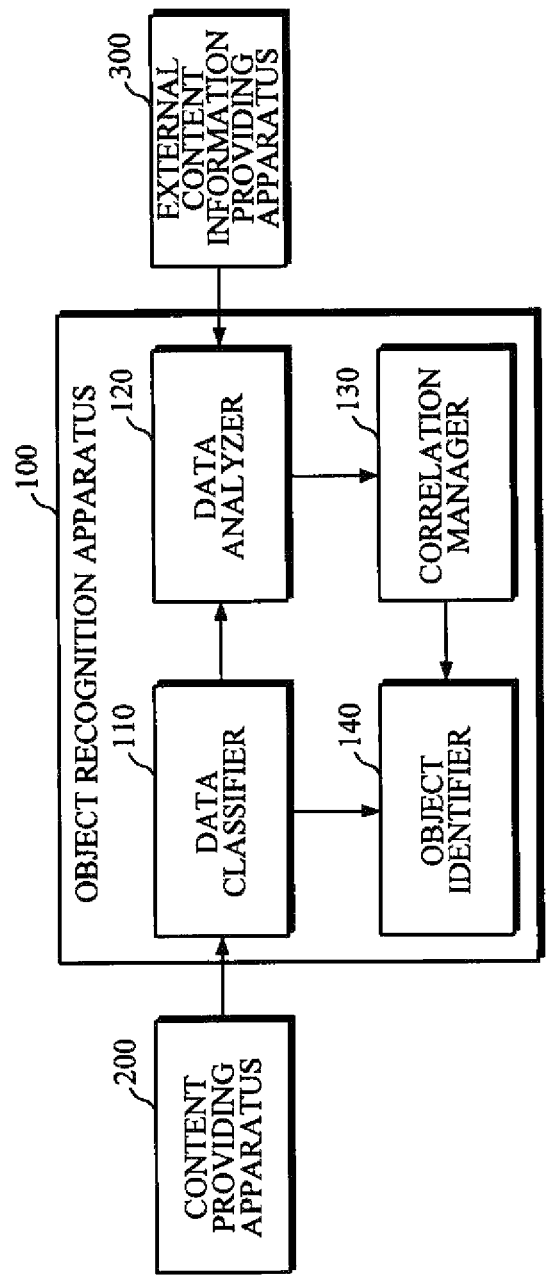
FIG. 1 is a diagram illustrating an apparatus for recognizing an object according to an exemplary embodiment.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

Herein, an apparatus and method for recognizing an object using correlation information about an object and content-related information in accordance with exemplary embodiments of the present disclosure will be described with reference to the accompanying drawings.

FIG. 1 is a diagram illustrating an apparatus for recognizing an object according to an exemplary embodiment.

Referring to FIG. 1, the apparatus 100 may include a data classifier 110, a data analyzer 120, a correlation manager 130, and an object identifier 140.

In one example, the apparatus 100 may receive internal content from a content providing apparatus 200 and external content information from an external content information providing apparatus 300, classify the received content into internal/external related-data, internal/external metadata, and image data, compute a correlation between an object and each related information by analyzing the classified data, and identify an object included in the content through the computed correlation.

Figure 2:
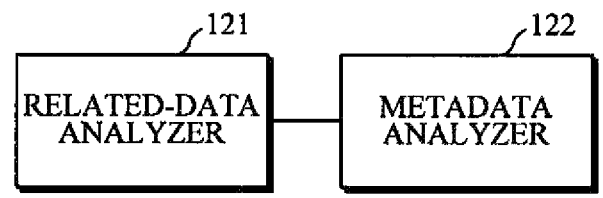
FIG. 2 is a diagram illustrating in detail the data analyzer of FIG. 1.
Figure 3:
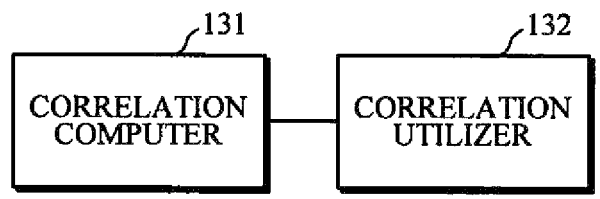
FIG. 3 is a diagram illustrating in detail the correlation manager of FIG. 1.

Detailed description of a data analysis method and a correlation computation method will be provided with reference to FIG. 2 and FIG. 3, respectively.

Here, the "related information" refers to all information about content other than the content of content itself. For example, in the case in which received content contains image data, related information refers to all information other than image information to be reproduced, and in the case in which received content contains voice data, related information refers to all information other than voice information to be reproduced.

In one example, the related information may include a variety of information, such as, but not limited to a closed caption that is unseen until a user activates a relevant function; an open caption, such as subtitles in a movie, which cannot be turned off; subtitles displayed as a part of an image to show speeches of characters or to explain a scene; speeches of characters in the content; a genre of the content of interest; an episode number; a broadcast channel; and characters.

According to the present exemplary embodiment, the related information may include internal related-data, internal metadata, and external content information, which may include external related-data and external metadata.

Here, the "internal related-data" refers to information that is transmitted together with content image to a content user so that the content user can use it.

For example, the internal related-data may include: a closed caption that is unseen until a user activates a relevant function; an open caption, such as subtitles in a movie, which cannot be turned off; subtitles displayed as a part of an image to show speeches of characters or to explain a scene; and speeches of characters.

The internal related-data is not information about the entire content, but is information about only a part of the content, such as scenes or frames.

Since objects present in the content may vary in scenes or frames, the internal related-data may be useful for objection recognition.

In addition, the internal metadata is content related information which is transmitted together with the content, and may include a genre of the content, an episode number, a broadcast channel of the content, characters of the content, and the like.

Unlike the internal related-data, the internal metadata is information about the entire content.

The "external content information" collectively refers to the external related-data and the external metadata, other than the aforementioned internal related-data and the internal metadata, among the entire content.

Related data and metadata which are contained in the content received from the content providing apparatus 200 may be classified into the internal related-data and the internal metadata, and related information and metadata of content received from the external content information providing apparatus 300 may be classified into the external related-data and the external metadata.

Considering types of metadata of content provided from content providers or portal service providers, any metadata information that can be obtained from the web or other external sources can be classified as external metadata.

Since the external related-data has a wider range than any other data, all information related to the content, other than the aforementioned internal related-data, internal metadata and external metadata, may be classified as the external related-data.

The data classifier 110 may separate the content received from the content providing apparatus 200 into internal related-data, internal metadata, and an image, and transmit them to the data analyzer 120 and the object identifier 140.

Here, the content providing apparatus 200 which delivers content that includes objects to be recognized by the object recognition apparatus 100 may be, but not limited to, an apparatus to provide content or an apparatus to request object recognition when providing content to the object recognition apparatus 100.

The content received from the content providing apparatus 200 by the data identifier 110 may include a variety of information or the contents of the information, which are provided from the Internet or through computer communications. According to the exemplary embodiment, the content may basically include an image which includes both a still image and a video.

The data analyzer 120 may receive the data classified by type by the data classifier 110 and also receive external content information from the external content information providing apparatus 300 upon request, then classify and analyze the received data and information by type, and generate image analysis data that enables search and collection of information that corresponds to a correlation between an object and related information which is stored in the correlation manager 130.

Here, the external content information providing apparatus 300 may provide external content information that includes external related-data and external metadata, rather than information about the content itself.

The external content information providing apparatus 300 may be a system that stores content information accumulated by a user of the object recognition apparatus 100, or a space, such as the Web, to which the metadata analyzer 122 accesses to collect information. However, a type of the external content information providing apparatus 300 is not limited thereto.

The data analyzer 120 will be described in detail with reference to FIG. 2.

The correlation manager 130 may compute a correlation between a target object included in the content and the related information including internal metadata and internal related-data, based on the received image analysis data, generate correlation information about the object and the related information (which will be simply referred to as "correlation information") that can be a reference for object recognition, and transform the generated correlation information into an applicable type or format according to the recognition technique used by the object identifier.

The generation and transformation of the correlation information by the correlation manager 130 will be described in detail with reference to FIG. 3.

The object identifier 140 may identify a particular object in the image data received from the data identifier 110 using the correlation information that has been received from the correlation manager 130, and based on the identification result, may identify an object in the content.

The identification of an object, according to an exemplary embodiment, may be performed through two processes: detection and identification. For example, with respect to an object in content, it is determined in a detection process that the object is a "human being," and then determined in an identification process that the object is named "A."

In the method of identifying an object using correlation information through detection and identification processes, if a target object is a person, the target object is detected as a person primarily using a correlation between the object and content-related-information, and then is finally identified using the detection result (that the target object is a person) and correlation information about content-related-information and the object.

Herein, the "object" may refer to all matters and persons that are likely to be present in an image of interest. That is, in the detection process, the object may include all matters and persons, and in the identification process, the object may be any person since the target object is detected as a person in the detection process.

However, according to another exemplary embodiment in which the detection and identification processes are performed simultaneously, the correlation between the target object and the content-related information may be used only once throughout the detection and identification processes.

FIG. 2 is a diagram illustrating in detail the data analyzer of FIG. 1.

Referring to FIG. 2, the data analyzer 120 may include a related-data analyzer 121, and a metadata analyzer 122.

The related-data analyzer 121 may basically analyze internal related-data received from the data classifier 110.

The related-data analyzer 121 analyzes the internal related-data for the purpose of generating input data (hereinafter, it will be referred to as "image analysis data") to be transmitted to the correlation manager 130.

The correlation manager 130 which stores correlation information about a correlation between an object and related-information may be capable of searching for and collecting information that indicates whether the transmitted data, i.e., the image analysis data from the related-data analyzer 121, is related to the correlation information, and the related-data analyzer 121 analyzes and processes the data into an appropriate format.

Here, the information about a correlation between an object and related-information stored in the correlation manager 130 refers to any information that matches with the image analysis data while containing the related information of the object such that the correlation information about the object and the related information can be generated according to a correlation computation algorithm.

The correlation computation algorithm will be described in detail with reference to FIG. 3.

In one example, with respect to a plurality of content of a particular genre, a statistic about how many times a specific object appears in the content, information about person present in particular content, nationality information of a particular person, and the like may be used, and any type of information may be used, without limitation, as long as it is related to the received image analysis data and used to generate correlation information of a target object.

In one example, the related-data analyzer 121 may perform speech-to-text analysis on speech of a person in the content, and further perform morphological analysis on text resulted from the speech-to-text-analysis so as to extract keywords.

The extracted keywords are transmitted to the correlation manager 130. The related-data analyzer 121 may not only receive the internal related-data from the data classifier 110, but also receive and analyze external related-data included in the information received from the external content information providing apparatus 300, upon request from the metadata analyzer 122.

The metadata analyzer 122 receives and analyzes the internal metadata from the data classifier 110, and transmits data among the analysis result that corresponds to image analysis data to the correlation manager 130. The image analysis data collectively refers to data that includes analysis result transmitted from the related-data analyzer 121 and the metadata analyzer 122 to the correlation manager 130.

In one example, if, information about a genre, an episode number, a broadcast channel and characters of content of interest is received as internal metadata, the related-data analyzer 121 may classify genre information and character information as image analysis data, and transmit the classified information to the correlation manager 130.

Here, the reason for classification into image analysis data is that the genre information can give information about an object present in content and the charter information can provide information about persons present in the content. However, the reason for classification is not limited thereto.

With respect to part of internal metadata received from the data classifier 110, additional information related to the content of interest may be received from the external content information providing apparatus 300 upon request based on the internal metadata.

In one example, when receiving information about a content title and episode number received from the data identifier 110, the metadata analyzer 122 may search for and request a variety of information related to the content of interest, such as, but not limited to, information about characters present in the corresponding episode, location of the content, and an object shown in the episode as a product placement advertisement, and receive the found or requested information.

The metadata analyzer 122 may generate image analysis data by analyzing, the external metadata of the content information received from the external content information providing apparatus 300, and transmit the generated image analysis data to the correlation manager 130. In addition, with respect to data that requires additional analysis since the metadata analyzer 122 cannot analyze (i.e., external related-data), the analysis metadata analyzer 122 may request the related-data analyzer 121 for additional analysis.

In one example, if the information received from the external content information providing apparatus 300 is text in the form of a sentence that has been found on the Web, the metadata analyzer 122 may extract main keywords from the text by morphological analysis and process the extracted keywords to additionally generate image analysis data.

Also, as described above, the metadata analyzer 122 may transmit the external content information that requires additional analysis, that is, the external related-data, to the related-data analyzer 121 to request the required analysis.

FIG. 3 is a diagram illustrating in detail the correlation manager of FIG. 1.

Referring to FIG. 3, the correlation manager 130 may include a correlation computer 131 and a correlation utilizer 132.

The correlation computer 131 may search for related information that correspond to the image analysis data received from the related-data analyzer 121 and the metadata analyzer 122 from among stored information about correlations between objects and related-information, generate correlation information about the object of interest and the related information that may affect a collected recognition result of the target object, and transmit the generated correlation information to the correlation utilizer 134.

The correlation computer 131 may generate the correlation information through a predefined algorithm using the image analysis data and the stored information about correlations between objects and related information.

As described above, the information about correlations between objects and related information refers to information that matches with the image analysis data while containing the related information of an object of interest such that the correlation information can be generated according to the correlation computation algorithm.

For example, assuming that an "object" is any type of matter and "related information" is a particular content genre, correlation information about the object and the related information may be generated using information about a correlation that contains a statistic on how many times a particular object appears in each of a plurality of contents of the same particular genre.

In one example, in a case where a particular object, for example, a "refrigerator," within "historical drama" content is analyzed through an algorithm for generating correlation information about an object and related information, using information about a correlation that contains the aforementioned statistic with respect to the refrigerator and historical drama, correlation information about the refrigerator and historical drama may be generated as "P(refrigerator|historical drama)=0," if a refrigerator does not appear in the drama.

Here, according to the algorithm described above, the correlation information may be generated by matching image analysis data and information about a correlation between the object and the related information of the content.

For example, it is assumed that person A and person B are target objects and there is content C whose related information is "drama," and also assumed, according to internal metadata or external metadata, that if person A is included in content C, person B is not present in content C.

In this example, correlation information with respect to objects A and B and content C may be generated as below, according to the aforementioned algorithm.

$P(A|C) \geq 0$            (correlation information 1)

$P(B|C) = 0$            (correlation information 2)

Correlation information 1 indicates that a probability that object A is present in content C is equal to or greater than 0 and correlation information 2 indicates that a probability that object B is present in content C is 0.

In addition, the correlation information may include correlations between one object and a plurality of related information, and correlation information with respect to, for example, object A and related information C and D may be defined and generated in more complex form, such as $P(A|C, D)$.

The correlation utilizer 132 may transform the correlation information received from the correlation computer 131 into a type and format that is usable by the object identifier 140.

Since an applicable type and format of correlation information may vary depending on a recognition technique to be used or object classification, the correlation utilizer 132 collects or modifies applicable part of the received correlation information, upon request from the object identifier 140, and transmits the collected or modified correlation information to the object identifier 140.

According to the exemplary embodiment in which object recognition is performed through two processes, detection and identification, a correlation between an object and content related-information is used to detect the object, and the object is finally recognized based on the detection result, using the content-related information and correlation information about the object and the related information. Thus, the correlation information may be changed into a suitable type and format such that it can be used once in each of detection and identification processes.

Contrarily, according to an exemplary embodiment in which an image-retrieval (IR) based object recognition technique is used and detection and identification are performed simultaneously, an object of interest in an image can be directly recognized without a separate detection process.

In this case, the correlation information may be changed into a suitable type and format such that it can be used only once throughout the simultaneous detection and identification process.

Aspects of the present disclosure are not limited to the above exemplary embodiments, such that a type and format of correlation information may be changed in any type and format as long as it is suitable to be used in object recognition.

FIG. 4 is a diagram illustrating a scenario of data flow between an object recognition apparatus and a peripheral device according to an exemplary embodiment.

Referring to FIG. 4, a data classifier 110 that has received content from a content providing apparatus 200 may separate the content into an image, internal related-data, and internal metadata, and then transmit the image to an object identifier 140 in 410, the internal metadata to a metadata analyzer 122 in 420, and the internal related-data to a related-data analyzer 121 in 430.

The metadata analyzer 122 that has received the internal metadata may request an external content information providing apparatus 300 for content related-information based on the internal metadata in 440, and the requested external content information providing apparatus 300 may transmit external content information related to the content to the metadata analyzer 122 in 450.

The metadata analyzer 122 may generate image analysis data by analyzing and processing the received internal metadata and external metadata included in the external content information, and transmit the generated image analysis data to a related-information computer 131 in 460. With respect to external related information among the received external content information that needs to be further analyzed, the metadata analyzer 122 may transmit the external related information to the related-data analyzer 121 to request analysis of the external related information in 470.

The related-data analyzer 121 may analyze and process the received internal related-data and the external related-data received from the metadata analyzer 122 to generate image analysis data, and then transmit the generated image analysis data to the correlation computer 131 in 480.

The correlation computer 131 may generate correlation information by matching the received image analysis data with stored information about correlations between objects and related information, and transmit the generated correlation information to a correlation utilizer 132 in 490. In 500, the correlation utilizer 132 may process or modify the generated correlation information to be applicable to the object recognition or may collect applicable correlation information, according to object recognition technique or object classification, and then transmit the resultant correlation information to the object identifier 140.

FIG. 5 is a flowchart illustrating an object recognition method according to an exemplary embodiment.

Referring to FIG. 3, content including a target object is received in 510, and then internal related-data, internal metadata and image data are separated from the content according to properties in 520. In 530, all separated data are transmitted to different components for different purposes: the image data for object identification, the internal related-data for related-data analysis, and the internal metadata for metadata analysis.

In one exemplary embodiment, content may be transmitted from the content providing apparatus 200. The content providing apparatus 200 may be a content provider server, an apparatus that inputs content and request object recognition, or any other apparatuses that deliver content that includes objects as recognition targets. However, the type of content providing apparatus 200 is not limited to the above.

Here, the content may be separated into internal related-data, internal metadata, and image data.

In one example, the image data may be transmitted to an object identifier 140, the internal related-data may be transmitted to a related-data analyzer 121, and the internal metadata may be transmitted to a metadata analyzer 122.

External content information is requested in 540, and external metadata in the received external content information and received internal metadata are analyzed and processed. In 550, it is determined whether a further analysis of the received data is required, and in response to a determination that the further analysis is not required, image analysis data containing the analysis result is generated in 560.

In one example, the external content information may be requested to an external content information providing apparatus 300. The external content information providing apparatus 300 may be a system that stores content information accumulated by an object recognition apparatus 100 or a space, such as the Web to which the metadata analyzer 122 can access to collect information. However, the type of external content information providing apparatus 300 is not limited thereto.

In one example, correlation information about an object and related information may include information about a correlation between a target object included in the content and related information, and may be generated by the correlation computer 131 which produces the correlation information based on received image analysis data.

In response to a determination that a separate analysis is required, the internal related-data is transmitted to be analyzed, and the image analysis data is generated by analyzing the transmitted internal related-data in 560.

In one example, the related-data analyzer 121 may receive the internal related-data, then generate the image analysis data by analyzing and processing the internal related-data, and transmit the image analysis data to the correlation computer 131.

In 570, the correlation information is generated by processing and transforming the received image analysis data into a format that is usable for object recognition, and then in 580, the correlation information is processed and changed into an applicable type and format according to a recognition method.

In one example, the correlation information may include information about a degree of correlation between a target object included in the content and the related information, and may be generated by matching the received image analysis data with information about correlations between objects and related information.

In one example, a correlation utilizer 132 may perform the processing, modification or collection of information for use in object recognition. Since an applicable type and format of correlation information can vary depending on an object recognition technique to be used, applicable part of the received correlation information may be processed or modified according to the object recognition technique and object classification and then the resulting correlation information may be transmitted.

According to an exemplary embodiment in which object recognition is performed through two processes, detection and identification, a correlation between an object and content related-information is used to detect the object, and the object is finally recognized based on the detection result, using the content-related information and correlation information. Thus, the type and format of correlation information may be changed to be usable once in each of detection and identification processes.

Contrarily, according to an exemplary embodiment in which an image-retrieval based object recognition technique is used and detection and identification are performed simultaneously, objects in an image can be readily recognized without a separate detection process.

In this exemplary embodiment, the type and format of correlation information may be changed to be usable only once throughout the simultaneous detection and identification process.

Aspects of the present disclosure are not limited to the above exemplary embodiments, such that a type and format of correlation information may be changed in any type and format as long as it is suitable to be used in object recognition.

The changed correlation information is received and the target object included in the content is recognized in 590.

According to the above exemplary embodiments, object recognition result is verified based on a correlation between an object and content-related information, thereby making it possible to increase accuracy in object recognition and thereby achieve higher reliability.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An apparatus for recognizing an object present in multimedia content, which includes image or audio data, internal related-data, and internal metadata, using correlation information between the object and multimedia content-related information, the apparatus comprising:
   a data classifier configured to receive the multimedia content from a multimedia content providing apparatus and separate the multimedia content into the internal related-data, the internal metadata, and the image data;
   a data analyzer configured to request and receive external content information, analyze the separated internal related-data, internal metadata, and image data and the received external content information, and generate image analysis data to be used to search for and extract, from the multimedia content, information about a correlation between an object included in the multimedia content and multimedia content-related information, wherein the multimedia content-related information is information on recognition of the object and includes the internal related-data and the internal metadata;
   a correlation manager configured to store information about a correlation between the object and the multimedia content-related information and generate the correlation information about the object and the multimedia content-related information by matching the generated image analysis data with the stored information about a correlation between the object and the multimedia content-related information; and
   an object identifier configured to receive the image data and the generated correlation information and identify a particular object in the image data.

2. The apparatus of claim 1, wherein the data analyzer comprises:
   a related-data analyzer configured to analyze and process the received internal related-data to generate the image analysis data to be matched with the information about a correlation between the object and the multimedia content-related information, and
   a metadata analyzer configured to request and receive external content information, and analyze and process the received internal metadata and the external content information to generate the image analysis data to be matched with the information about a correlation between the object and the multimedia content-related information.

3. The apparatus of claim 2, wherein the metadata analyzer transmits external related-data included in the received external content information to the related-data analyzer to request data analysis.

4. The apparatus of claim 1, wherein the correlation manager comprises:
   a correlation computer configured to store the information about a correlation between the object and the multimedia content-related information and generate the correlation information about the object and the multimedia content-related information by matching the received image analysis data with the information about a correlation between the object and the multimedia content-related information, wherein the generated correlation information is a reference for recognizing the object present in the multimedia content, and
   a correlation utilizer configured to change the generated correlation information into an applicable type and format according to object classification and an object recognition technique used by the object identifier.

5. A computer implemented method of recognizing an object present in multimedia content, which includes image or audio data, internal related-data, and internal metadata, using correlation information between the object and multimedia content-related information, the method comprising:

receiving, by a data classifier loaded on at least one hardware processor, the multimedia content including the object and separating the multimedia content into the internal related-data, the internal metadata, and the image data according to properties;

receiving, by a data analyzer loaded on the at least one hardware processor, the separated internal related-data, internal metadata, and image data and generating image analysis data by analyzing and processing the received internal related-data, internal metadata, and image data, wherein the image analysis data is to be matched with information about a correlation between the object and related information, wherein the multimedia content-related information is information on recognition of the object and includes the internal related-data and the internal metadata;

generating, by a correlation manager loaded on the at least one hardware processor, correlation information about the object and the multimedia content-related information by matching the generated image analysis data and the information about a correlation between the object and multimedia content-related information, wherein the correlation information is a reference for recognizing the object present in the multimedia content; and identifying, by an object identifier loaded on the at least one hardware processor, the object present in the multimedia content using the generated correlation information.

6. The method of claim 5, wherein the generating of the image analysis data comprises:

requesting the external content information, receiving the requested external content information, and generating the image analysis data to be matched with the information about a correlation between the object and the multimedia content-related information by analyzing and processing external metadata included in the received external content information and the received internal related-data, in response to a determination that an additional analysis is required for the external related-data included in the received external content information, transmitting the external related-data to request data analysis, and generating the image analysis data to be matched with the information about a correlation between the object and the multimedia content-related information by analyzing and processing the received internal related-data and the external related-data.

7. The method of claim 5, wherein the generating of the correlation information comprises:

generating the correlation information about the object and the multimedia content-related information by matching the received image analysis data with the information about a correlation between the object and multimedia content-related information, wherein the correlation information is a reference for recognizing the object present in the multimedia content, and changing the generated correlation information into an applicable type and format according to object classification and an object recognition technique for recognizing the object in the multimedia content.

* * * * *